United States Patent
Cerea et al.

(10) Patent No.: US 12,468,916 B2
(45) Date of Patent: Nov. 11, 2025

(54) RFID (RADIO FREQUENCY IDENTIFICATION) TAG, IN PARTICULAR FOR WASHABLE ITEMS

(71) Applicant: DATAMARS SA, Lamone (CH)

(72) Inventors: Luca Cerea, Varese (IT); Fabio Zacchello, Cairate (IT); Damien Pachoud, Pregassona (CH)

(73) Assignee: DATAMARS SA, Lamone (CH)

( * ) Notice: Subject to any disclaimer, the term of this patent is extended or adjusted under 35 U.S.C. 154(b) by 0 days.

(21) Appl. No.: 18/730,883

(22) PCT Filed: Jun. 1, 2022

(86) PCT No.: PCT/EP2022/064957
§ 371 (c)(1),
(2) Date: Jul. 22, 2024

(87) PCT Pub. No.: WO2023/232249
PCT Pub. Date: Dec. 7, 2023

(65) Prior Publication Data
US 2025/0103846 A1    Mar. 27, 2025

(51) Int. Cl.
*G06K 19/07* (2006.01)
*G06K 19/077* (2006.01)
(52) U.S. Cl.
CPC ... *G06K 19/0724* (2013.01); *G06K 19/07767* (2013.01); *G06K 19/07786* (2013.01)
(58) Field of Classification Search
CPC ............... G06K 19/027; G06K 19/072; G06K 19/0724; G06K 19/07745; G06K 19/07747; G06K 19/07767; G06K 19/07773; G06K 19/07777; G06K 19/07779; G06K 19/07786; G06K 19/07794
See application file for complete search history.

(56) References Cited

U.S. PATENT DOCUMENTS

| | | | |
|---|---|---|---|
| 11,507,792 B2* | 11/2022 | Forster | G06K 19/0723 |
| 11,797,928 B2* | 10/2023 | Cohen | G06Q 30/0639 |
| 11,900,200 B2* | 2/2024 | Forster | H01Q 1/36 |
| 2019/0220724 A1 | 7/2019 | Huhtasalo | |
| 2021/0166100 A1 | 6/2021 | Buhler et al. | |
| 2023/0351141 A1* | 11/2023 | Cerea | G06K 19/07728 |

FOREIGN PATENT DOCUMENTS

DE    102018212594 A1    1/2020

* cited by examiner

*Primary Examiner* — Thien M Le
*Assistant Examiner* — April A Taylor
(74) *Attorney, Agent, or Firm* — The Webb Law Firm

(57) ABSTRACT

Provided is an RFID (Radio Frequency Identification) tag, in particular for washable items, including a module. The module includes a ultra high frequency (UHF) microchip connected to a near field UHF antenna arranged inside the module, the UHF microchip supporting radio communication at ultra high frequency; a high frequency/near field communication (HF/NFC) microchip connected to an air-coil high frequency (HF) metal antenna arranged outside the module, the HF microchip supporting radio communication at high frequency and preferably NFC protocol. The RFID tag further includes a UHF dipole antenna arranged on a textile or polymeric substrate to form at least one loop, and the air-coil HF metal antenna and the module being arranged inside the at least one loop of the UHF dipole antenna.

10 Claims, 5 Drawing Sheets

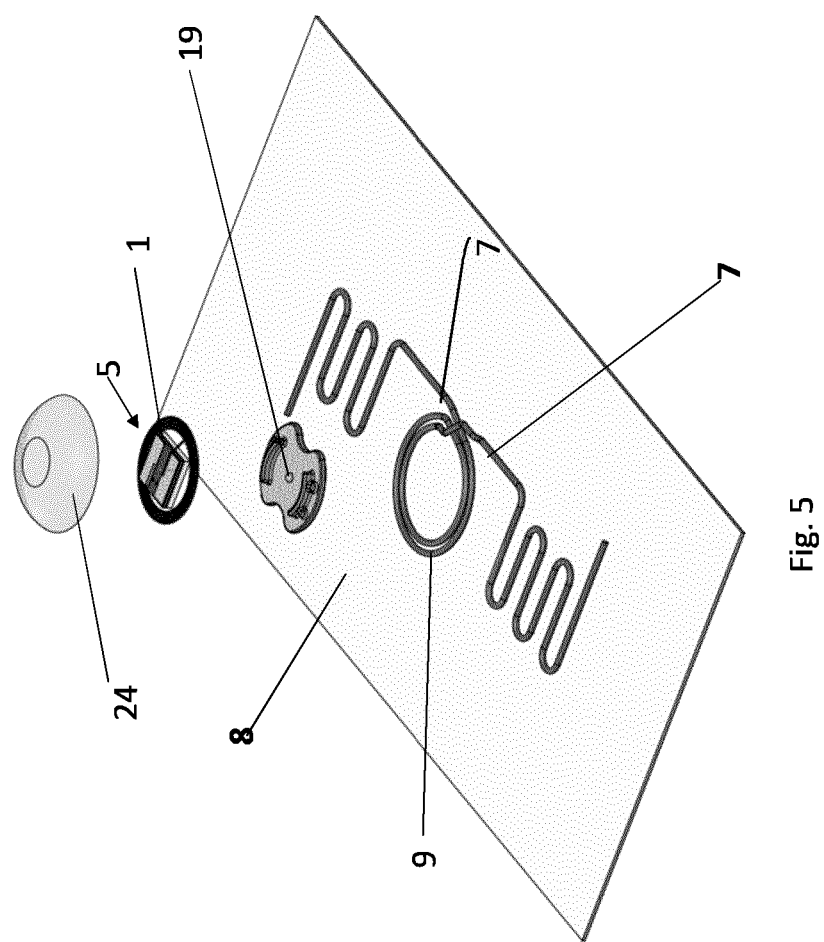

RFID (RADIO FREQUENCY IDENTIFICATION) TAG, IN PARTICULAR FOR WASHABLE ITEMS

CROSS-REFERENCE TO RELATED APPLICATION

This application is the United States national phase of International Patent Application No. PCT/EP2022/064957 filed Jun. 1, 2022, the disclosure of which is hereby incorporated by reference in its entirety.

BACKGROUND OF THE INVENTION

Field of the Invention

The present invention relates to the technical filed of RFID (Radio Frequency Identification) tags, in particular for washable items. More particularly, the invention relates to tags of the type cited above, suitable to communicate in two different frequencies.

Description of Related Art

As known, radio-frequency identification tags (RFID) are used to identify or track items. Dual frequency RFID tags are conceived to support different types of applications: applications where long distance or multiple reading is required, such as those concerned with logistic, and applications where short distance is required, to cite some the marketed oriented or antitheft applications, where compatibility with near field communication (NFC) technology is in general preferred and profiting of NFC readers available on latest generation mobile phones.

In order to communicate in two different frequencies, the dual frequency RFID tag includes a dual mode microchip or two separate microchips, a ultra high frequency (UHF) microchip supporting radio communication at ultra high frequency and an high frequency/near field communication (HF/NFC) microchip supporting radio communication at high frequency, in particular with NFC protocol.

The microchip(s) is connected to respective antennas, a UHF antenna and a HF/NFC antenna; a dipole antenna may also be inductively coupled with the microchip for the long-range applications. The dipole antenna and the HF antenna are bonded to one (or more) layer of the tag, for instance a polyethylene terephthalate (PET) layer. Indeed, they are also known as inlay antennas. The tag, including the inlay antennas and the microchip(s), is attached to the item, for instance to a label of a cloth, a textile or any other object to be traced, typically used for retail applications.

A critical issue of the dual frequency RFID tags based on an inlay substrate is that they are relatively fragile to resist to a variety of applications potentially covering the whole lifecycle of the items. Indeed, the tag may trace the item from the origin, at manufacturing site, trough supply chain, up to the customer (and subsequently, at recycling). In one or more stages, the tag is subject to physical (chemical, thermal, mechanical) solicitation endangering, among other, the electrical connections or the positioning of the inlay antenna(s) and the microchip(s), and therefore endangering the capability of the tag to keep communication working in one or both the frequencies.

The solicitations may be severe, such as when the textile is washed in a laundry. If the HF/NFC inlay antenna is damaged or its connection is broken, for instance due to warpage or fold of the label at washing, short range readings become impossible. In that case, even if the UHF antenna keeps working, the items is no more traceable under NFC communication.

SUMMARY OF THE INVENTION

The technical problem at the base of the present invention is to provide a dual frequency RFID tag which is suitable to resist to solicitations typically involved in the lifecycle of the item tagged, including solicitations generated by washing, and to provide a RFID in which dual frequency communication capability are always reliable, overcoming the limitations and drawbacks that currently affect the dual frequency RFID tags of the prior art.

The idea of solution of the present invention is to provide a dual frequency RFID tag wherein a HF/NFC antenna is not provided as an inlay antenna but as air-coil HF metal antenna.

The air-coil HF metal antenna is coupled to a module which incorporates the UHF microchip (and the UHF antenna) and the HF/NFC microchip.

The air-coil HF metal antenna is not part of the module but a component external to it. Moreover, the air-coil HF metal antenna and the module are located within (or on top, with an overlap) the loop(s) of a dipole antenna inductively coupled with the UHF microchip.

According to idea of solution mentioned above, the technical problem at the base of the present invention is solved by an RFID (Radio Frequency Identification) tag, in particular for washable items, including a module comprising:
- a UHF microchip connected to a near field UHF antenna arranged inside the module, the UHF microchip supporting radio communication at Ultra High Frequency;
- an HF/NFC microchip connected to an air-coil HF metal antenna arranged outside the module, the HF microchip supporting radio communication at High Frequency and preferably NFC protocol, the RFID tag further comprising
- a UHF dipole antenna arranged on a textile or polymeric substrate to form at least one loop, and said air-coil HF metal antenna and said module being arranged inside or overlapping the at least one loop of the UHF dipole antenna.

The term "overlapping" means that the air-coil HF metal antenna and the module may be arranged on a plane different from the plane where the loop is arranged (above or below), however in such a way that projections of the air-coil HF metal antenna and the module onto the plane of the loop falls inside the loop.

The module typically includes a PCB substrate; other substrate may also be used, as alternative to PCB.

The UHF microchip, the HF/NFC microchip and the near field UHF antenna are arranged on a surface of the PCB substrate.

Pads (see 13, 13a, 13b FIGS. 1 and 3) connect the HF/NFC microchip with the air-coil HF metal antenna.

Preferably, the pads are arranged on a surface of the PCB substrate opposite to the surface where the HF/NFC microchip and the near field UHF antenna are arranged.

The pads are connected to the HF/NFC microchip by means of vias passing through the PCB substrate.

The end portions of the air-coil HF metal antenna are bonded to the pads on the module. The pads on the module are connected to the HF/NFC microchip with vias. The microchip can either be connected with wire-bonding to the vias or with flip-chip (in this case, flip-chip, no wire-bonding is required to connect the microchip to the vias).

The air-coil HF metal antenna may be arranged around the module (without limitation to other arrangement, however).

For instance, the air-coil HF metal antenna has a circular shape and the module has a quadrangular shape, and a diameter of the air-coil HF metal antenna substantially correspond to a diagonal of the module, so as the module is surrounded by the air-coil HF metal antenna in close contact with it.

However, the air-coil HF metal antenna may have a size less than a size of the module and be overlapped (with or without contact) to the module, instead of surrounding it. Also in this case, the air-coil HF metal antenna may have a circular shape and the module a quadrangular shape, just to cite an example.

Nothing prevents that the air-coil HF metal antenna and the module have different shapes or same shape: to cite another example, the air-coil HF metal antenna may be quadrangular and surround a quadrangular shape delimited by the module.

Moreover, the air-coil HF metal antenna may be arranged at different height on an axis perpendicular to the surface of the module.

A height 0 ('zero') is defined at a point where the surface of the module is crossed by an axis V perpendicular to the surface of the module (FIG. 1).

The air-coil HF metal antenna may be arranged at height 0 (such as in FIG. 1).

In another embodiment, the air-coil HF metal antenna may be at a positive height (H+, FIG. 1), at a distance from the surface of the module; in another embodiment the antenna 5 is at a negative height (H−, FIG. 1) at a distance from the opposite surface of the module.

A holder is preferably provided to hold the module and the air-coil HF metal antenna in a correct position and to further protect them. The holder facilitates the manufacturing process as can support the module and HF antenna during the production step. In addition, the holder can provide an additional mechanical strength of the tags, increasing its robustness against external mechanical stresses.

The holder includes a central seat, housing the module and a peripheral flange around the central seat, wherein the air-coil HF metal antenna is fit on. Preferably the air-coil HF metal antenna is force fitted on the peripheral flange.

Further features of the RFID tag according to the present invention will be apparent from a description on an embodiment therefore given for exemplificative and non-limiting purpose with reference to the enclosed drawings.

BRIEF DESCRIPTION OF THE DRAWINGS

The terms Fig., Figs., Figure, and Figures are used interchangeably in the specification to refer to the corresponding figures in the drawings.

FIG. 5 is a perspective of the RFID tag of FIG. 1 at parts detached.

DESCRIPTION OF THE INVENTION

Figure 1:
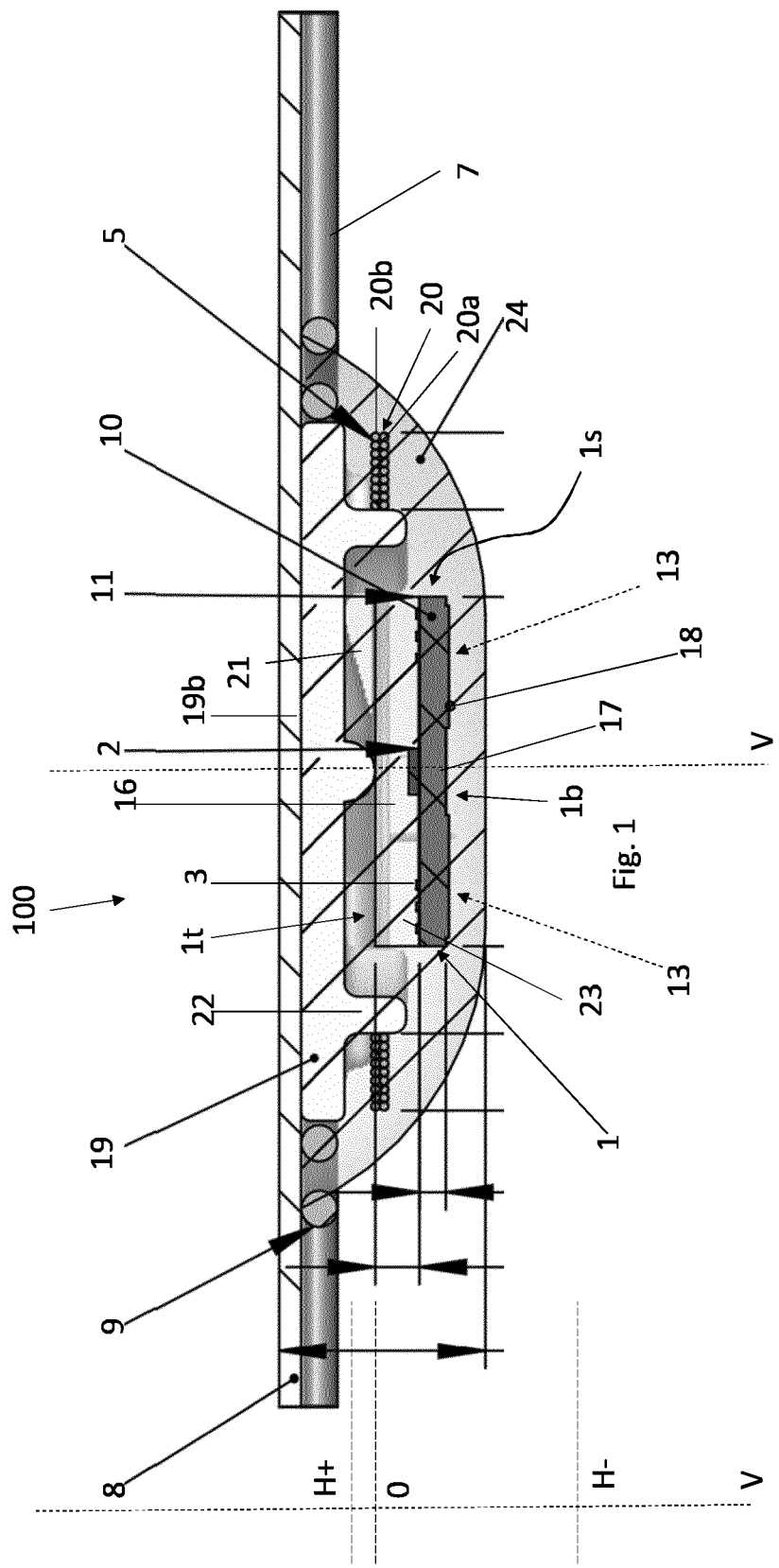
FIG. 1 is a partial cross section of an RFID tag according to the present invention.

An embodiment of the RFID tag according to the present invention is descried below with reference to the annexed drawings.

The RFID tag, indicated with reference number 100, is a dual frequency RFID tag conceived to support different type of applications, including those where long distance or multiple reading is required, and those where short distance is required, such as the applications where the tag is read by a smartphone based on the NFC communication protocol.

The RFID tag 100 is adapted to be attached to an item, for instance a textile (or other objects) and it is in principle destined to stay attached to it for the whole lifecycle thereof, from manufacturing to recycling, through a plurality of stages in which it is potentially subject to mechanical stress, in contact with materials or liquids, such as when the item (and the tag) is washable and treated at laundries. The tag is for instance attached to a label or the item.

The RFID tag according to the present invention is particularly adapted to resist to solicitations, such as chemical, mechanical or thermal stresses, and to keep its internal electrical components protected and correctly working.

To this aim, a module 1 of the tag 100 is provided, on which a UHF microchip 2, connected to a near field UHF antenna 3, and an HF/NFC microchip 4, connected to an air-coil HF metal antenna 5, are arranged.

It is relevant in this respect to note that the air-coil HF metal antenna 5 is not integrally part of the module 1 but provided as a separate component, as explained in more detail below.

A UHF dipole antenna 7 is arranged on a textile or polymeric substrate 8 to form at least one loop 9. The air-coil HF metal antenna 5 and the module 1 are placed inside the at least one loop 9.

In other words, according to the present invention three main components are separately provided to manufacture the RFID tag 100: the module 1, the dipole antenna 7 and the air-coil HF metal antenna 5. The three components are physically structured and arranged as follows.

The air-coil HF metal antenna 5 forms a coil ring, preferably having a plurality of turns overlapped, more preferably overlapped to extend in the vertical direction V, so as to avoid increasing a diameter of the ring in a longitudinal plane (the one where the dipole antenna 7 is extended).

The air-coil HF metal antenna 5 is electrically connected to the HF/NFC microchip 4 on the module 1. The antenna 5 is preferably centred with respect to the module 1, with a centre of the coil ring aligned in the vertical direction V with a centre of the module 1. The vertical direction is indicated with V in FIG. 1.

According to different embodiments, different distancing (0, H+, H−) may be set between the module 1 and the air-coil HF metal antenna 5 in the vertical direction V. When such distancing is 0, the air-coil HF metal antenna 5 is in contact with the module 1, at the top 1t surface thereof.

In the embodiment represented in the drawings, the air-coil HF metal antenna 5 surrounds the module 1, in close proximity or in contact with a lateral surface 1s of the module 1. The module 1 and the air-coil HF metal antenna 5 are inside the loop 9 formed by the dipole antenna 7. The term "inside" has not to be interpreted in a limiting way, for instance considering the module 1 and the air-coil HF metal antenna 5 arranged on the same plane of the loop 9 and inside it. To the contrary, the air-coil HF metal antenna and the module according to the present invention may be arranged on a plane different from the plane where the loop 9 is arranged (above or below), and so that the projections of the air-coil HF metal antenna 5 and the module 1 onto the plane of the loop 9 falls inside the loop.

The dipole antenna 7 is preferably not in physical contact with the module 1 and the air-coil HF metal antenna 5.

The applicant discovered that such an arrangement of the three main components 1, 5, 7 mentioned above is more reliable, resistant to solicitation, warpage, folding and general stresses than prior art dual RFID tags.

These last (prior art tags) have a layered structure of inlay antennas for long and short readings, where the HF/NFC antenna is an inlay thin printed metal trace extended on a relatively wide area, also far from a module where the microchip(s) is arranged.

To the contrary, according to the present disclosure, the air-coil HF metal antenna 5 is not in inlay format, it is extended within the borders of the loop 9 of the dipole antenna 7, it is coupled in close contact but externally to the module 1, i.e. it is not integrally part of the module 1, it is formed preferably by turns extending in the vertical direction.

Such extension in the vertical direction V of the HF metal antenna 5 is obtained by overlapping a plurality of turns wounded on each other or, according to other possible embodiments, adopting one single turn where the thickness of the metal wire forming the single turn coil is suitably chosen. For instance, a metal wire with a square section with predetermined (and sufficiently high) thickness T is taken to form the single turn.

As to the dipole antenna 7, the term loop 9 is not limiting the shape of the loop 9: the loop 9 includes for instance closed loop where the dipole antenna 7 overlaps at least at one point or open loop 7 in the form of Omega, with no contacts or overlapping of the dipole antenna 7.

Further details of the invention are provided below.

The module 1 includes a PCB substrate, indicated with 10.

Pads 13 are on the PCB substrate 10.

Figure 2:
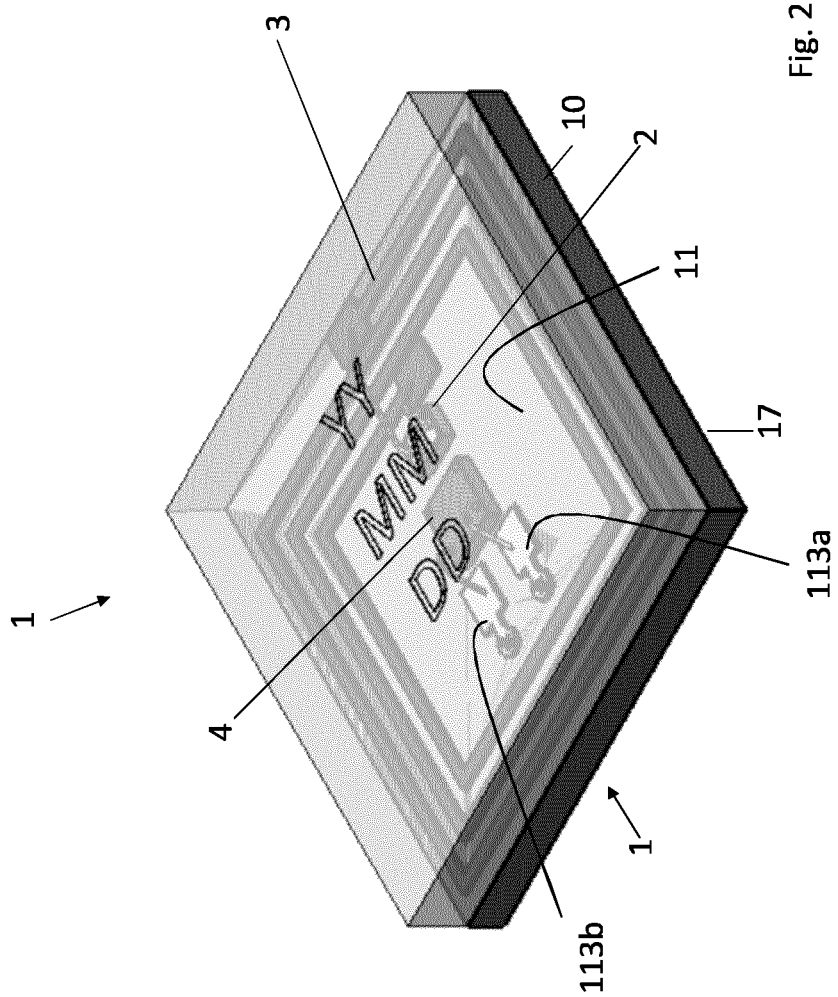
FIG. 2 is a perspective view of a module of the RFID tag of FIG. 1.
Figure 3:
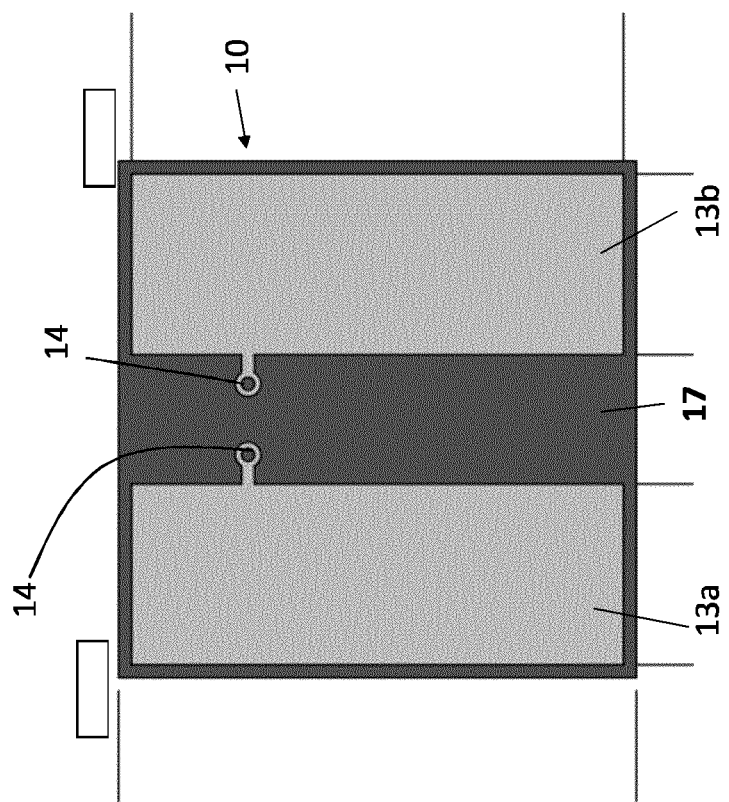
FIG. 3 is a bottom view of the module of FIG. 2.

Pads 13 connect the HF/NFC microchip 4 with the air-coil HF metal antenna 5. The embodiment disclosed at FIGS. 2 and 3 is not limiting but provide an example on how pads 13 may be arranged: a first pad 13a and a second pad 13b (FIG. 3) are on a surface 17 of the PCB 10. These pads 13 cover a wide area of the PCB substrate 10, for instance one third or two thirds of the surface 17 (in FIG. 3 coverage is more than two thirds). A central area of the PCB surface 17 may be free from pads. Extension of the pads may be substantially along the whole length of the PCB surface 17, as in the embodiment of FIG. 3; however, other extensions may be considered, preferably on at least 80%, and up to 99% of the length of the PCB substrate 10.

In the area 15 of the PCB substrate 10 between the first and second pads 13a, 13b, vias 14 are disposed. The vias pass through the PCB 10, up to the surface 11 which is shown in FIG. 2. Here other pads 113a, 113b are provided, and are connected to the pads 13a, 13b by means of wires passing through the vias 14.

Figure 4:
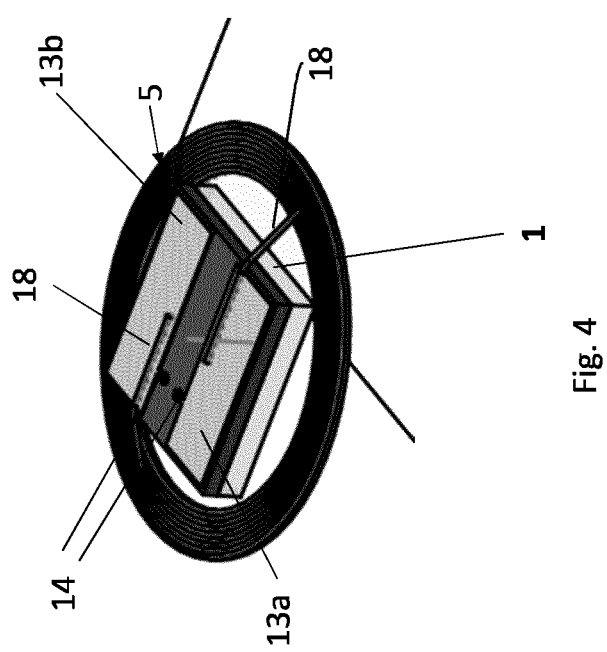
FIG. 4 is a perspective view of a module and an air-coil HF metal antenna of the RFID tag of FIG. 1.

In the embodiment disclosed in FIG. 4, the air-coil HF metal antenna 5 is arranged around the module 1. In this example, the air-coil HF metal antenna 5 is winded, the antenna wire having two opposite end portions 18 connected, respectively, to the pad 13a and the pad 13b. The end portions 18 extend in part on the pads 13a, 13b and the remaining portion of the wire forming the air-coil HF metal antenna 5 extends (wounded) around the module 1.

In one aspect of the disclosure, a holder 19 is provided to keep the module 1 and the air-coil HF metal antenna 5 in place.

The holder 19 provides centring the antenna 5 with respect to the module 1. The holder 19 protects the UHF microchip 2 and the HF/NFC microchip 4; preferably, the UHF microchip 2 and the HF/NFC microchip 4 are between the PCB substrate 10 and the holder 19.

A central seat 21 houses the module 1 and a peripheral flange 22 around the central seat 21 is centred on the central seat 21. At components assembled, a centre of the central seat 21 (and a centre of the module 1) is substantially aligned on a centre of the loop 9 of the dipole antenna 7.

The air-coil HF metal antenna 5 is fit on the peripheral flange 22, preferably force fitted on it. At components assembled, also a centre of the air-coil HF metal antenna 5 is substantially aligned on a centre of the loop 9 of the dipole antenna 7 (and on a centre of the module 1).

The holder 19 contributes to increase resistance of the components 1, 5, 7 to solicitations and keeps all component in place. The loop 9 may extend (wounded) around the holder (FIG. 1).

In an aspect of the present invention, a protective moulding 23 is arranged on top of the UHF microchip 2, the HF/NFC microchip 4 and the near field UHF antenna 3. The protective moulding 23 is between the central seat 21 of the holder 19 and the PCB substrate 10. The UHF microchip 2, the HF/NFC microchip 4 and the near field UHF antenna 3 are therefore protected by being sandwiched between the seat 21 and the PCB substrate 10. A back portion 19b of the holder is inside the loop 9 and a front portion is faced to the moulding 23. The back portion of the holder 19b is not exposed but it is covered by the textile or polymeric substrate 8. Although this arrangement has been given in detail, it does not preclude other possible arrangement of the holder 19 and its parts.

A protective encapsulation (such as a resin) 24 attached to the textile or polymeric substrate 8 is further provided for protection. The protective encapsulation 24 encapsulates the module 1, the holder 19, the air-coil HF metal antenna 5 and at least part of the loop 9 of the UHF dipole antenna 7 (see for instance FIG. 5).

The protective encapsulation resin 24 touches the air-coil HF metal antenna 5, at least part of the holder 19, the PCB substrate 10, preferably, also part of the dipole antenna 7, the loop 9, the protective moulding 23 and the layer in which the antenna 7 is inlayed. The protective encapsulation resin 24 further improves mechanical resistance and attachment of the module 1, the dipole UHF antenna 7 and the holder 19 to the substrate 8. Although this arrangement of the protective encapsulation resin 24 has been given in detail, it does not preclude other possible arrangements.

The applicant has made experiments and comparisons with the prior art as to resistance of the RFID tag after several treatments of an item, in particular a washable textile to which the tag was attached. Advantageously, after the treatments, the UHF microchip 2 and the HF/NFC microchip 4 were perfectly working and communicating at long and short distance, they were still perfectly connected to the near field UHF antenna 3 and to the HF air coil antenna 5, no displacement of the components with respect to the holder 19 has been detected, and the holder was still perfectly aligned at the centre of the loop 19 of the dipole antenna. After same number of treatments, several defects have been detected in the prior art tags: part of the tag was no more communicating, part thereof was partly damaged at antenna(s) connection(s), part suffered from displacement with respect to their original position on the supporting layer, part of the inlayed antenna for the HF/NFC communication was broken.

The invention claimed is:

1. A RFID (Radio Frequency Identification) tag for washable items, the tag comprising:
   a module comprising:
      an ultra-high frequency (UHF) microchip connected to a near field UHF antenna arranged inside the module, the UHF microchip supporting radio communication at ultra-high frequency; and
      a high-frequency/near field communication (HF/NFC) microchip supporting radio communication at high frequency protocol;
   a UHF dipole antenna arranged on a textile or polymeric substrate to form at least one loop; and
   an air-coil high frequency HF metal antenna arranged outside the module,
   wherein said air-coil HF metal antenna and said module are arranged inside the at least one loop of the UHF dipole antenna,
   wherein the module includes a printed circuit board (PCB) substrate,
   wherein the UHF microchip, the HF/NFC microchip, and the near field UHF dipole antenna are arranged on a surface of the PCB substrate, and
   wherein the air-coil HF metal antenna is arranged around the PCB substrate.

2. The RFID tag according to claim 1, wherein pads to connect the HF/NFC microchip with the air-coil HF metal antenna are arranged on an opposite surface of the PCB substrate and are connected to the HF/NFC microchip by means of vias passing through the PCB substrate.

3. The RFID tag according to claim 2, wherein the pads comprise a first pad and a second pad, wherein the first and second pads cover at least one third of an area of said opposite surface of the PCB substrate.

4. The RFID tag according to claim 3, the first and second pads extend on at least 80 percent of a length of the PCB substrate, and an uncovered area of the PCB substrate arranged between the first and second pads is an area wherein the vias are disposed.

5. The RFID tag according to claim 1, comprising a holder comprising a central seat housing the module and a peripheral flange around the central seat, the air-coil HF metal antenna is fit on the peripheral flange.

6. The RFID tag according to claim 5, comprising a protective encapsulation resin attached to the textile or polymeric substrate and encapsulating the module, the holder, the air-coil HF metal antenna and at least part of said at least one loop of the UHF dipole antenna.

7. The RFID tag according to claim 1, wherein the module comprises a protective moulding arranged on top of the UHF microchip, the HF/NFC microchip and the near field UHF antenna.

8. The RFID tag according to claim 1, wherein the UHF microchip and the HF/NFC microchip are integrated in the same microchip, as a dual frequency microchip.

9. The RFID tag according to claim 1, wherein the air-coil HF metal antenna is made of copper.

10. The RFID tag according to claim 1, wherein the near field UHF antenna is inductively coupled with the UHF dipole antenna.

* * * * *